United States Patent

Knüttel

[11] Patent Number: 5,839,371
[45] Date of Patent: Nov. 24, 1998

[54] MONO- OR TWIN-RAIL OVERHEAD CHAIN CONVEYOR

[75] Inventor: Werner Knüttel, Grosskrotzenburg, Germany

[73] Assignee: Fredenhagen GmbH & Co. KG, Germany

[21] Appl. No.: 704,517

[22] PCT Filed: Mar. 13, 1995

[86] PCT No.: PCT/EP95/00923

§ 371 Date: Sep. 5, 1996

§ 102(e) Date: Sep. 5, 1996

[87] PCT Pub. No.: WO95/25056

PCT Pub. Date: Sep. 21, 1995

[30] Foreign Application Priority Data

Mar. 14, 1994 [DE] Germany .............................. 9404183. U

[51] Int. Cl.⁶ .................................................. B65G 19/00
[52] U.S. Cl. ..................................... 104/172.4; 104/172.5; 198/686
[58] Field of Search ............................. 104/172.3, 172.4, 104/172.5, 172.1; 198/686

[56] References Cited

U.S. PATENT DOCUMENTS

| 3,127,006 | 3/1964 | Tochtermann et al. ................. | 198/686 |
| 3,972,140 | 8/1976 | Casparro .................................. | 198/686 |

FOREIGN PATENT DOCUMENTS

| 145001 | 1/1950 | Australia ................................ | 198/686 |

*Primary Examiner*—Mark Tuan Le
*Attorney, Agent, or Firm*—Bierman, Muserlian and Lucas

[57] ABSTRACT

A mono- or twin-rail overhead chain conveyor 10', 12' useful for transporting heavy loads such as motor vehicle parts wherein the conveyor has a chain track (14) in the form of an I-shaped profile with running gear 18,20 which can move along said track and has roller blocks 26,28 for mounting rollers 30,32 which are supported on the chain track, the roller blocks being connected to a traction means 42 for pulling the running gear and for a monorail overhead chain conveyor, the running gear is in the form of a loading running gear and for a twin-rail overhead chain conveyor, it is in the form of towing running gear which interacts with loading running gear 82 movable on a load rail 78 running below the chain track and to render wear-free, silent running possible, the traction means 42 is a rubber or plastic belt having a single-stranded metal, glass fiber or carbon fiber insert 46.

12 Claims, 11 Drawing Sheets

MONO- OR TWIN-RAIL OVERHEAD CHAIN CONVEYOR

The invention relates to a mono- or twin-rail overhead chain conveyor, in particular for transporting heavy loads such as motor vehicle parts, having a chain track in the form of an I-shaped profile with running gear which can move along said track and having roller blocks for mounting rollers which are supported on the chain track, said roller blocks being connected to a traction means for pulling the running gear and said running gear being designed for a mono-rail overhead chain conveyor in the form of loading running gear and for a twin-rail overhead chain conveyor in the form of towing running gear which interacts with loading running gear movable on a load rail running below the chain track.

Mono- and twin-rail overhead chain conveyors are continuous conveyors in which the conveyed material is always transported underneath a single-stranded traction means, i.e. suspended. The conveying process is positive here, with the conveying track being disposable anywhere within the area and with curves being possible in both the horizontal and vertical planes.

As a general principle, steel chains in the form of bolt-linked and flat-linked chains are used as the traction means. Steel ropes or textile ropes are only possible for lightweight mono-rail overhead chain conveyors, so that positive drives are automatically assured as a rule.

Regardless of the type of traction means, however, it requires intensive servicing and inspection.

An endless conveyor is known from NL-A-7 014 018 in which a cable sheathed, for example with nylon, as corrosion protection is used as the traction means. In addition to the classic mono- or twin-rail overhead chain conveyors, as illustrated and described in—for example—"Lueger Lexikon der Technik, Fördertechnik und Fabrikorganisation Vol. 1, p. 246 ff., published by Rowohlt Taschenbuch Verlag GmbH, Germany, a large number of suspension conveying devices are known with design features that can differ from those described at the outset. For example, in a hanger-type conveyor according to DE-AS 1 230 354, a pulling belt running on edge is used, in which several pulling ropes parallel in the longitudinal direction are vulcanized in. A corresponding hanger-type conveying system is however suitable exclusively for use in a horizontal plane, since otherwise a tensile strain would be exerted on the pulling ropes arranged one above the other that varies widely enough to break these ropes.

Suspension devices intended for the transportation of garment products are described in DE 40 17 821 A1 and DE 35 10 195 A1. Here a drive belt can interact with driving dogs of supporting brackets to move the latter along a guide track formed by a square section. Specially designed plastic rails are required for guidance of the drive frame.

In the case of load carriers according to DE 41 21 772 A1, DE 27 40 594 A1, U.S. Pat. No. 26,78,718, U.S. Pat. No. 2,980,258 or DE 25 45 676 A1, chain links are used that are drivable using friction wheels, for example. The chain links can be connected at their connection points to towing running gear.

The object underlying the present invention is to develop a mono- or twin-rail over-lead chain conveyor of the type mentioned above such that an almost maintenance-free traction means can be used that is drivable without problem and which can be guided simply in respect of the route, however without the need for design changes to the mono- or twin-rail overhead chain conveyor at least in respect of the chain track and loading track.

The problem is substantially solved in accordance with the invention in that the traction means is comprising a rubber or plastic material having a single-stranded insert of metal, glass fiber or carbon fiber. In particular, the belt is a rubber belt with rectangular cross-section, into which is vulcanized a steel insert preferably concentrically to the longitudinal axis of the belt.

By the teachings in accordance with the invention the drawbacks immanent in known mono- or twin-rail overhead chain conveyors because of the bolt-linked and flat-linked chains used are eliminated, without the disadvantages obtained from a mono- or twin-rail overhead chain conveyor being dispensed with.

As a result of the fact that the mono- or twin-rail overhead chain conveyor in accordance with the invention differs from known ones only in that the bolt-linked and flat-linked chain is replaced by the rubber belt having a steel insert, the lubricants required for chains are not necessary. Wear is also prevented that would otherwise occur in the joints of the chain links. It is furthermore advantageous that the mono- or twin-rail overhead chain conveyor operates with little noise.

Nevertheless, tensile forces can be transmitted with the mono- or twin-rail overhead chain conveyor that are known from bolt-linked and flat-linked chains, since the rubber belt contains the metal insert preferably designed as a steel rope.

Since the insert such as a metal insert is single-stranded and extends in particular coaxially to the longitudinal axis of the belt, ascending and descending sections can be traversed without problem since the steel insert is always subjected to the same load and hence no differing tensile stresses occur.

The use of a belt permits a higher conveying speed compared with a mono- or twin-rail overhead chain conveyor with the conventional chain.

The speed can be increased here by 50 to 100%.

Furthermore, fewer tensioning stations are necessary, since wear on the traction means occurs—as already mentioned—only to a negligible extent. By contrast, the chain links of a pulling chain are subject to considerable wear.

By the use of a belt comprising plastic and in particular rubber, it is furthermore possible to use it in the food processing industry, since lubrication of the traction means is not necessary, nor does the traction means have poorly accessible areas.

To permit the use of the traction means proposed in accordance with the invention even without fundamental changes to the towing running gear and hence to the roller blocks, it is provided in a further development of the invention that the belt has lateral cutouts for accommodating roller block sides of the towing running gear.

The belt itself can have a width corresponding to that of a bolt-linked or flat-linked chain used in a mono- or twin-rail overhead chain conveyor. Here too, it is emphasized that—with the exception of the traction means—the teachings in accordance with the invention can be employed without design changes to known mono- or twin-rail overhead chain conveyors.

In order to permit driving of the traction means, for example by frictional grip, a further development of the invention provides that the belt runs in respect of its lateral surfaces flush or almost flush with outer-surface sides of the roller blocks, so that the latter do not impair the drive action.

If as a result of a fault the rubber or plastic belt is broken, a repair can be effected in simple fashion by exposing the metal inserts of the belt ends and connecting them using clamping elements to a wire rope running parallel to the ends.

In accordance with an independent invention proposal, the use of a belt comprising a rubber or plastic material with steel insert running coaxially to its central axis as a substitute for a bolt-linked or flat-linked chain of a mono- or twin-rail overhead chain conveyor is envisaged that comprises a chain track in the form of an I-shaped profile with running gear movable along the latter and interacting with loading running gear moving on a load rail running below the chain track or itself designed as loading running gear.

In a mono- or twin-rail overhead chain conveyor in accordance with the invention the belt can be guided between friction wheels used as the drive.

Alternatively, it is possible for the belt to be guided between endless belts which serve as the drive. Finally, it can be provided that along one side of the belt several pressure rollers are disposed in a line, while on the opposite side and associated with the pressure rollers an endless drive belt is provided. The belt is guided between the drive belt and the pressure rollers and is driven by frictional grip.

To form horizontal curves, it is only sufficient that the belt is guided along rollers whose axes are on an arc or circular section. Alternatively, the belt can be guided along a section of a rotatably mounted disk.

However, a vertical curve is also feasible in simple fashion. In this way it is only necessary that between running gear units connected directly or indirectly to a load support spacers are disposed that extend from the track and are connected to the belt, thereby ensuring that the belt follows the route set by the track.

The teachings in accordance with the invention are of course also transposable to a floor conveyor which—like a mono- or twin-rail overhead chain conveyor—does not have to undergo a design change since only a replacement of the traction means is necessary.

Further details, advantages and features of the invention are shown not only in the claims and in the features therein, singly and/or in combination, but also in the following description of design examples shown in the drawing.

In the figures, in which identical elements are as a rule provided with identical reference numbers, sections or detailed view of a mono- or twin-rail overhead chain conveyor are shown that from their general design correspond to conventional structures. For that reason FIGS. 1, 2 and 5, 6 show respectively a twin-rail overhead chain conveyor (10) and a mono-rail overhead chain conveyor (12) of standard design.

Figure 1:
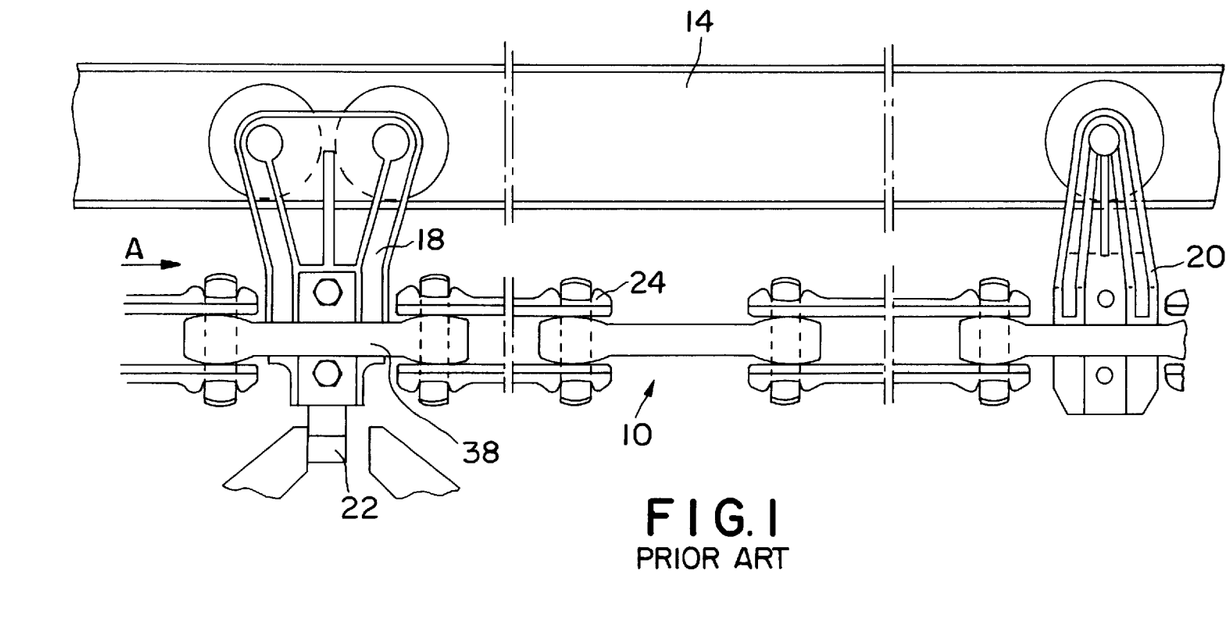
FIG. 1 shows a section from a twin-rail overhead chain conveyor according to the prior art.

The twin-rail overhead chain conveyor (10) shown in section in FIG. 1 (Power and Free conveyor) therefore comprises in the normal manner a chain track (14) in the form of an I-shaped profile (16) with running gear (18) and (20) along this track, said running gear (18) being designed as towing running gear from which projects a driving dog (22) that can be gripped by an indicated pawl of loading running gear, not shown, and also movable in loading running gear underneath the chain track and also in the form of an I-shaped profile. The load to be conveyed, such as a bodywork section or other motor vehicle component, is then suspended from the loading running gear or from a crosspiece connecting two successive running gear units.

To move the running gear (18), (20), it is provided with a traction means (24) that can be a bolt-linked or flat-linked chain. In the embodiment, a bolt-linked chain (24) is shown.

To rule out sagging of the traction means (24), running gear serving as spacers is provided between towing running gear (18) and corresponds to the running gear (20) in its design.

Regardless of whether the running gear is a towing running gear or a spacer, the running gear (18), (20) has bearing blocks (26), (28) for wheels (30), (32) that are movable along the chain track (14), i.e. along the I-shaped profile. (16).

Figure 2:
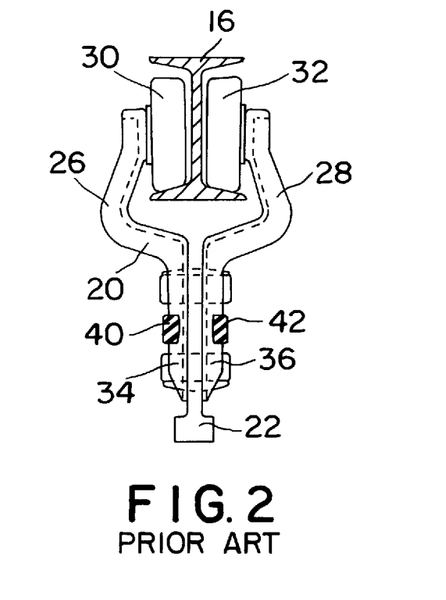
FIG. 2 shows the twin-rail overhead chain conveyor according to FIG. 1 in direction A.
Figure 9:
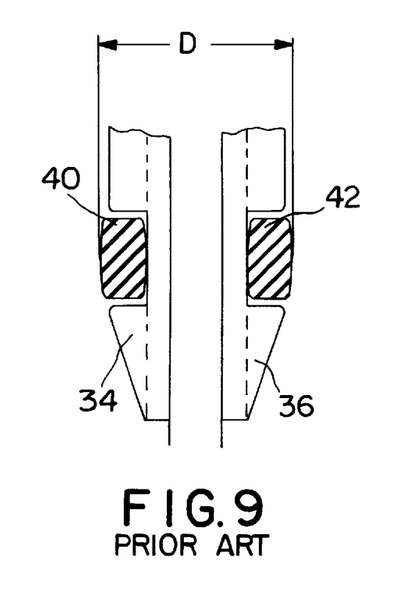
FIG. 9 shows a section from a running gear unit of the twin-rail overhead chain conveyor according to FIG. 1.

The bearing blocks (26) and (28) run with their lower vertical sections inside a chain link (38) whose longitudinal sides (40), (42) are shown hatched in FIGS. 2 and 9. The outer distance between the sides (40) and (42) is D.

Figure 3:
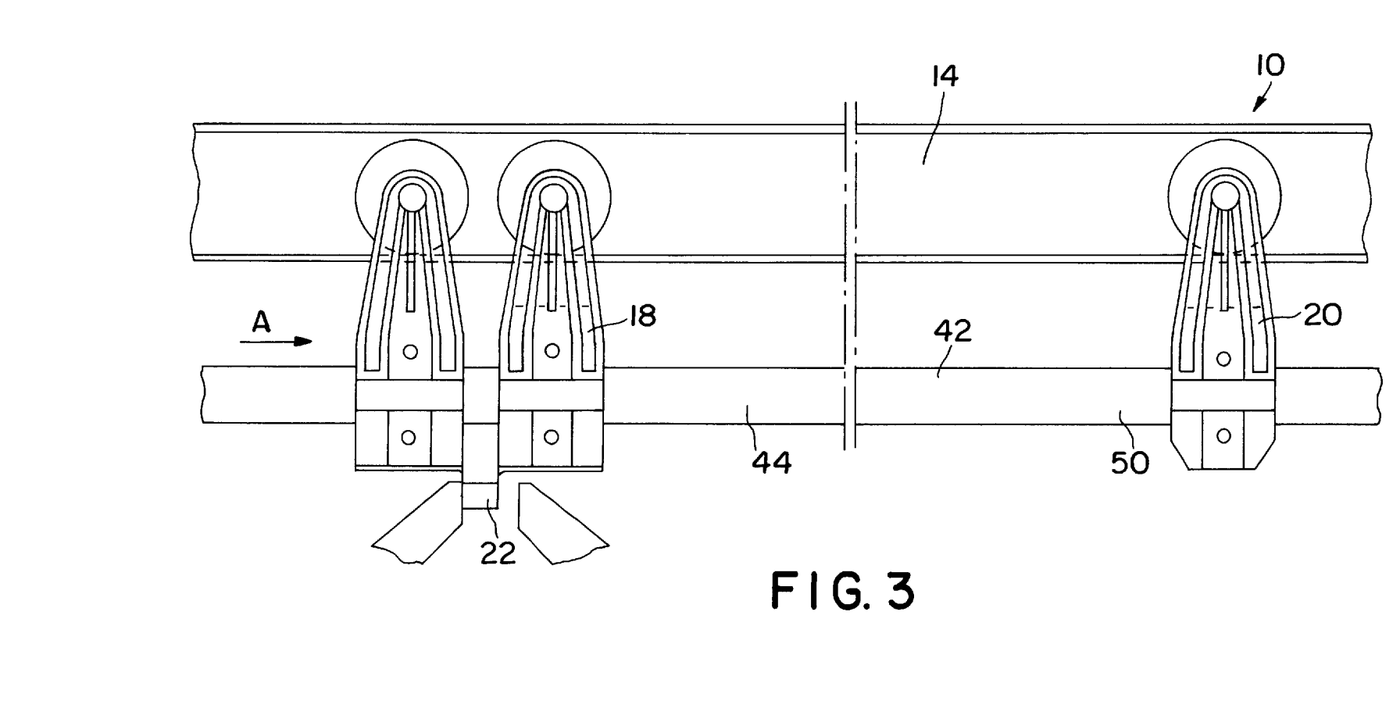
FIG. 3 shows a section from a twin-rail overhead chain conveyor designed in accordance with the invention.
Figure 4:
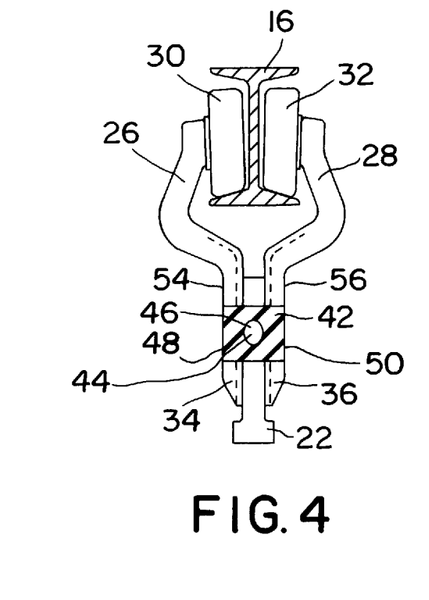
FIG. 4 shows the twin-rail overhead chain conveyor according to FIG. 3 in direction A.
Figure 5:
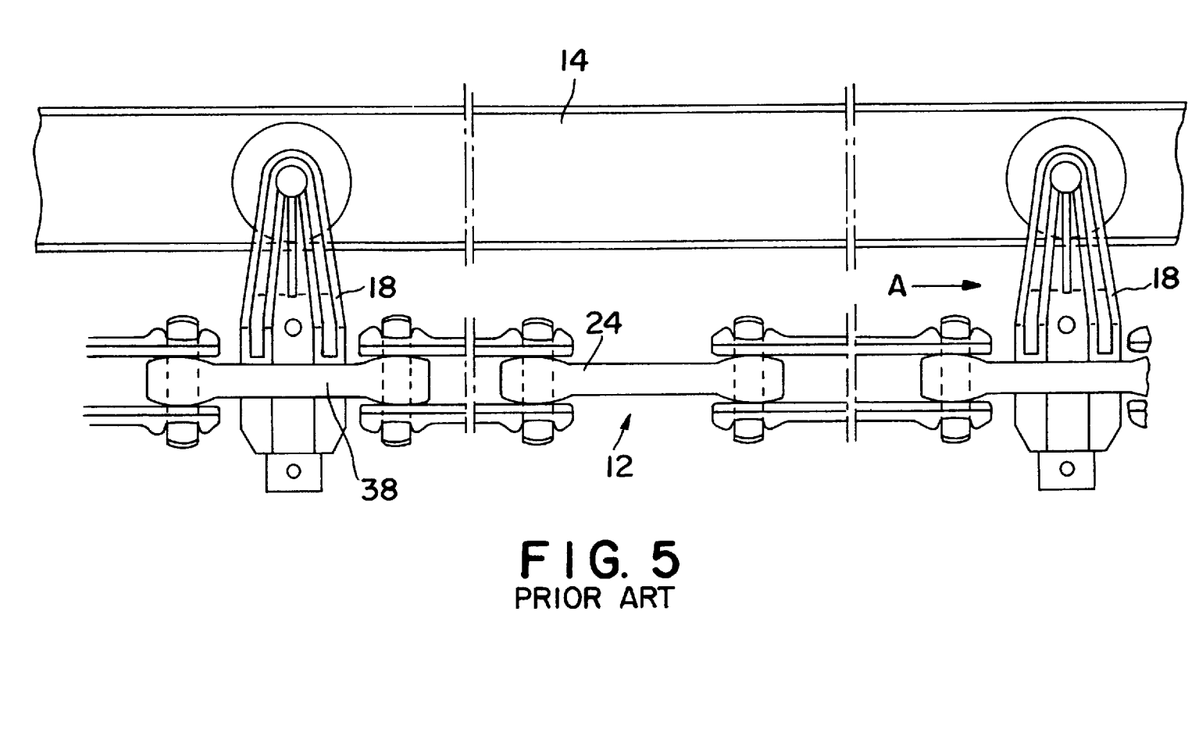
FIG. 5 shows a section from a mono-rail overhead chain conveyor according to the prior art.
Figure 6:
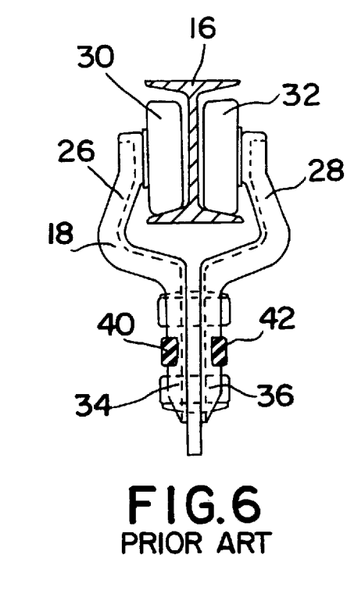
FIG. 6 shows the mono-rail overhead chain conveyor according to FIG. 5 in direction A.
Figure 7:
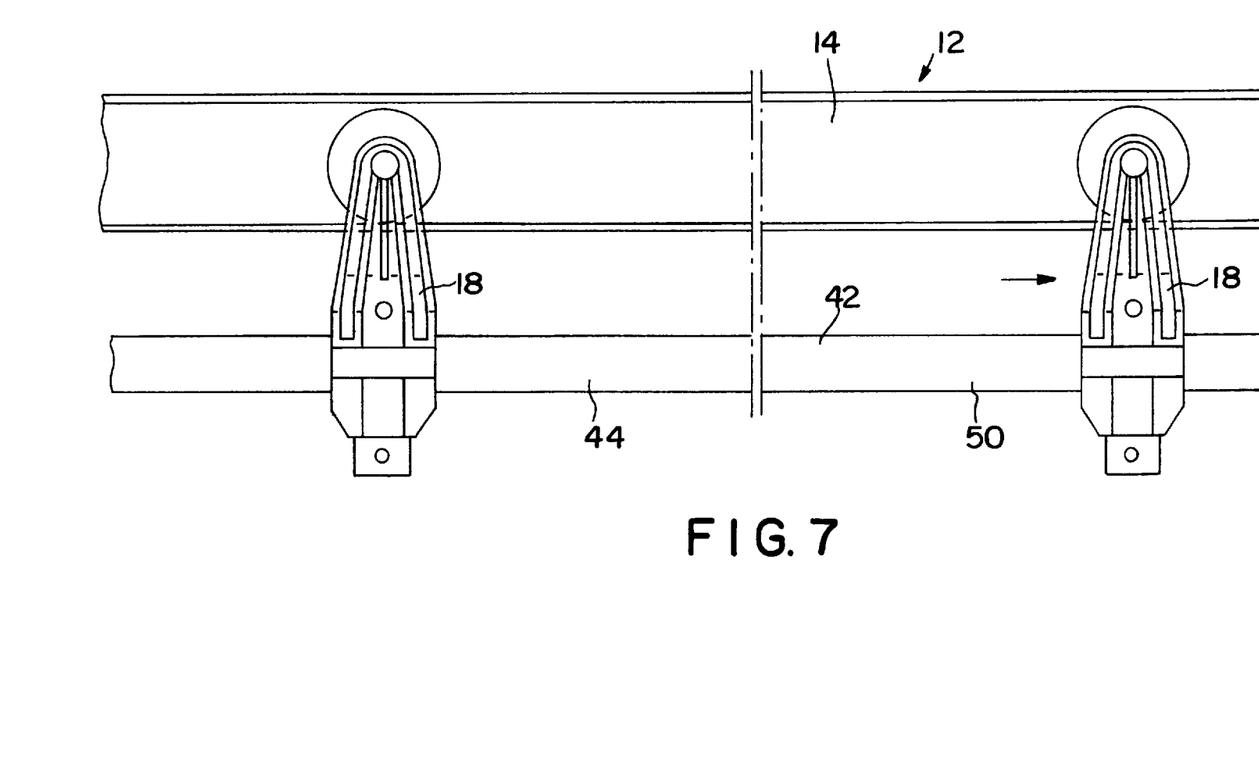
FIG. 7 shows a section from a mono-rail overhead chain conveyor designed in accordance with the invention.
Figure 8:
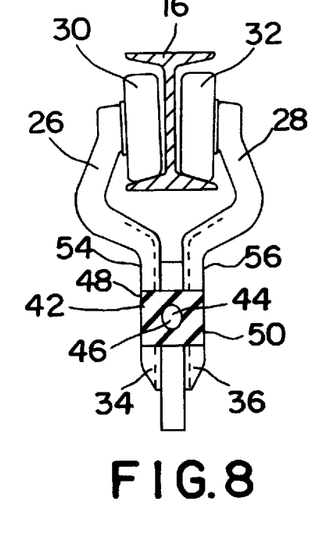
FIG. 8 shows the mono-rail overhead chain conveyor according to FIG. 7 in direction A.

Without diverging from the fundamental design of the twin-rail overhead chain conveyor (10), it is proposed in accordance with the invention that the traction means in the form of the bolt-linked or flat-linked chain be replaced by a rubber belt (42) preferably having a smooth outer surface and a metal insert in the form of a wire rope (46) running concentrically to the longitudinal axis (44). This does not however generally entail any changes in particular in the dimensions of the parts used in the twin-rail overhead chain conveyor (10). For that reason, the reference numbers used in FIGS. 3 and 4 are those already used in connection with the twin-rail overhead chain conveyor (10) according to FIGS. 1 and 2. The twin-rail overhead chain conveyor having the traction means (42) in accordance with the invention is furthermore identified with the reference number (10') to stress their similarity.

Instead of the traction means (24) in the form of the bolt-linked or flat-linked chain used according to the prior art, the rubber traction means (42) of rectangular cross section and with vulcanized wire rope insert (46) is used in accordance with the invention, with the geometric dimensions of the traction means being retained to the extent that the width of the belt (42) corresponds to the outer distance D of the chain link (38) enclosing the sides (36) and (38) of the bearing blocks (26) and (28). For that reason the width of the belt (42) is also given as D in FIG. 10.

Figure 10:
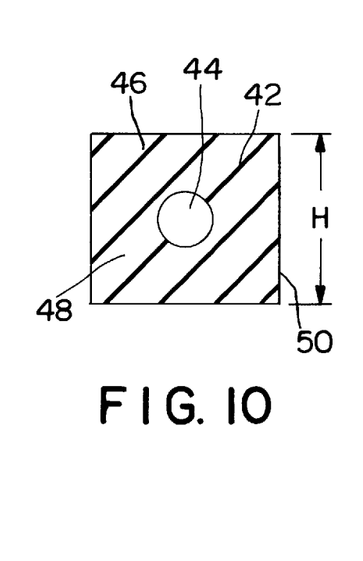
FIG. 10 shows a cross-section through a traction means used in accordance with the invention for the twin-rail overhead chain conveyor according to FIG. 3.

The height of the belt (42) is H, with the height H being preferably slightly smaller than the width D. The ratio of D to H is preferably about 1.2:1.

Figure 11:
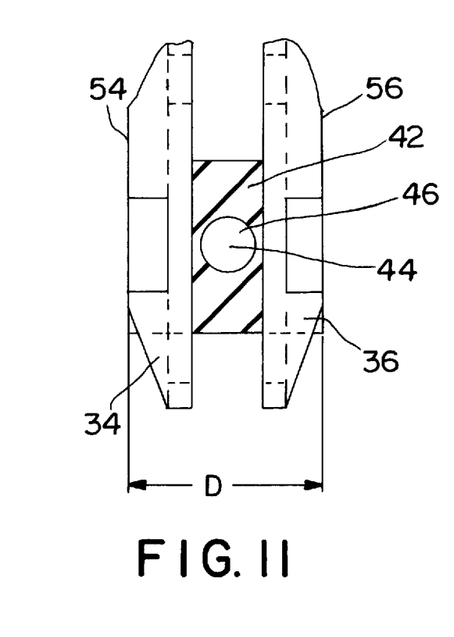
FIG. 11 shows a section of a running gear unit of the twin-rail overhead chain conveyor according to FIG. 3.

In order for the bearing blocks 826), (28) or their vertical sides (34), (36) impair the driving action of the belt (42) by frictional grip, the belt has corresponding cutouts to accommodate the sides (34), (36), where before and behind the sides (34), (36) the lateral or running surfaces (58), (50) are fit flush into the lateral surfaces (54), (56) of the bearing blocks (26), (28). For that reason the distance of the lateral surfaces (54), (56) is also identified as D in FIG. 11.

To connect the running gear (18), (20) to the belt (42), corresponding cutouts can be provided in the belt (42) at the place of assembly of the twin-rail overhead chain conveyor (10'). This has the advantage that a running gear unit can be positioned at every required position, which is an option not open when the traction means is a bolt-linked or flat-linked chain, since the running gear has to be aligned with the chain links.

Since a mono-rail overhead chain conveyor differs from a twin-rail overhead chain conveyor only in that the towing running gear doubles as loading running gear, in the mono-rail overhead chain conveyors (12) and (12') of FIGS. 5–8 have identical reference numbers to the corresponding elements in FIGS. 1 and 4, since as already mentioned the mono-rail overhead chain conveyor (12') in accordance with the invention differs from the prior art only to the extent that the traction means (24) in the form of a bolt-linked chain is also replaced by one with rectangular rubber belt (42) with vulcanized wire rope insert.

Figure 12:
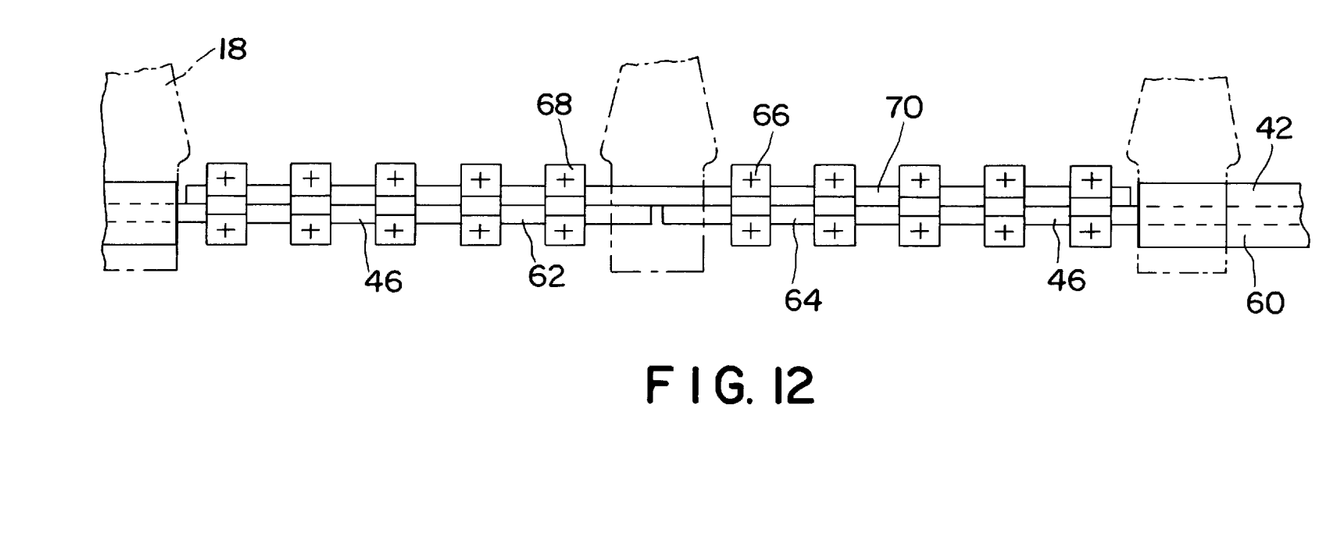
FIG. 12 shows an ad-hoc connection of sections of a traction means used in accordance with the invention.

By the use in accordance with the invention of a rubber belt with single-stranded metal insert, advantages accrue not only in respect of maintenance, low noise operation and reduction of wear, concomitant with a reduction in the number of tensioning stations, but also from the repair in simple fashion of the traction means (42), as is made clear in FIG. 12.

To connect separated sections (58) and (60) of the traction means (62), a wire rope (46) is exposed at the ends, then permitting the free ends (62, (64) to be connected by clamps or clips (66), (68) to a wire rope section (70) running parallel to the free ends (62), (64).

Figure 13:
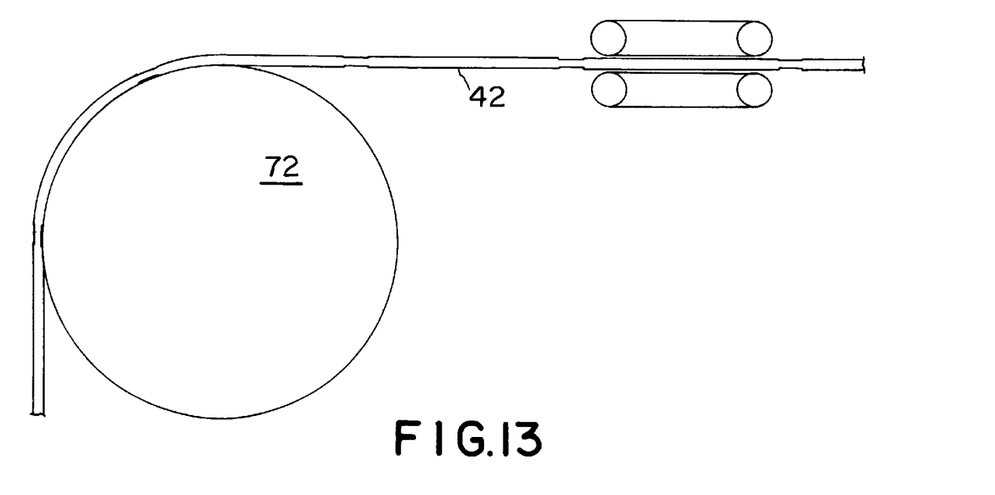
FIG. 13 shows a first embodiment of a horizontal curve of the traction means with the drive for the latter.

To drive the belt (42) it can be guided between friction wheels in contact with the running surfaces (48), (50), such that the belt (42) can be pulled simply along the track (14). To permit the belt (42) to traverse a horizontal curve, there are various possibilities as shown in the embodiments in FIGS. 13 and 14. For example, in the embodiment in FIG. 13 the belt (42) is guided along a section of a rotatably mounted disk (72).

Figure 14:
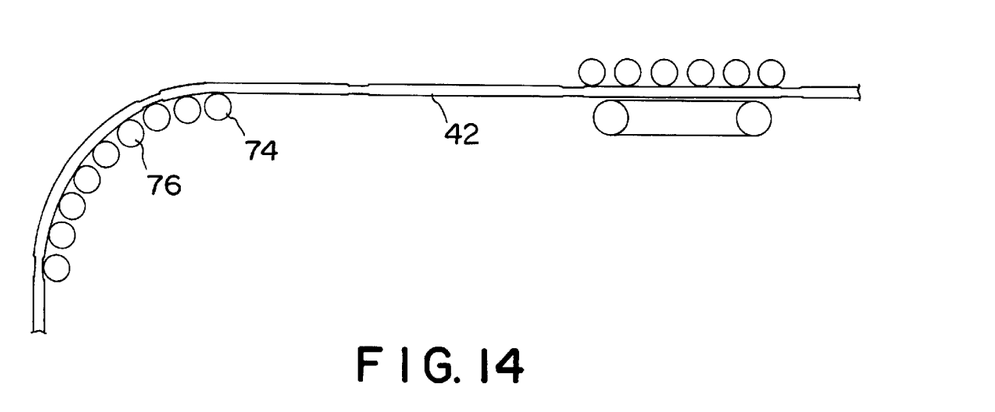
FIG. 14 shows a second embodiment of a horizontal curve of the traction means with the drive for the latter.

In the embodiment in FIG. 14, the belt (42) is guided along rollers (74), (76) mounted on an arc or circular section.

Figure 15:
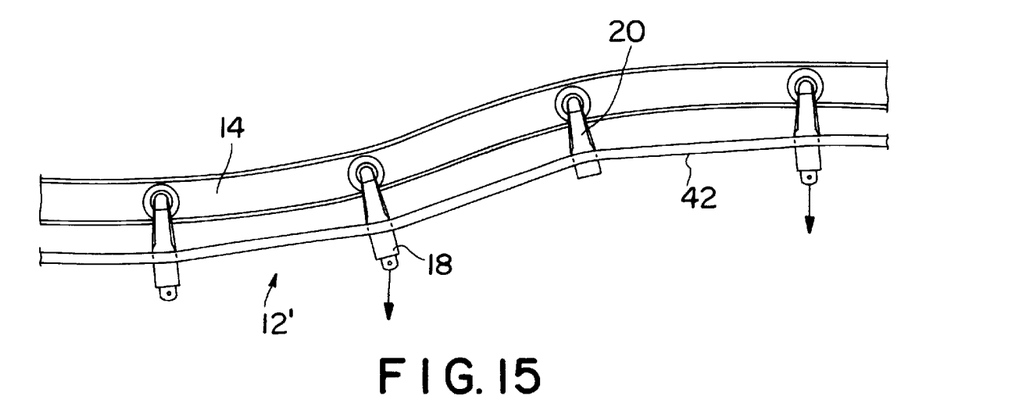
FIG. 15 shows a section from a vertical curve of a twin-rail overhead chain conveyor.

To traverse vertical curves, it is necessary both for the twin-rail overhead chain conveyor (10') and for the mono-rail overhead chain conveyor (12') that spacers (20) extend to a sufficient extent from the respective tracks (14) between the towing and loading running gear (18), in order to hold the traction means (42) such that it cannot sag or drag on a track in ascending or descending sections.

Figure 16:
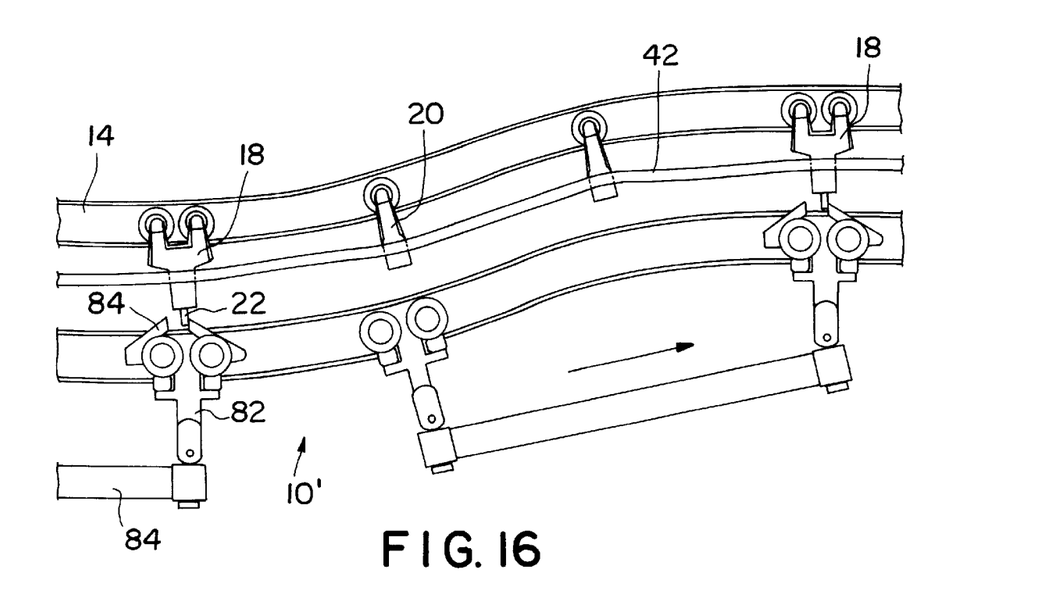
FIG. 16 shows a section from a vertical curve of a twin-rail overhead chain conveyor.

FIG. 16 shows a section of a twin-rail overhead chain conveyor where underneath the chain track (14) is a loading track (78) along which loading running gear (80) and (82) connected by a cross-piece (84) can be moved. To do so, pawls (84) extending from the loading running gear (82) interact with the driving dog (22) of the towing running gear (18).

Figure 17:
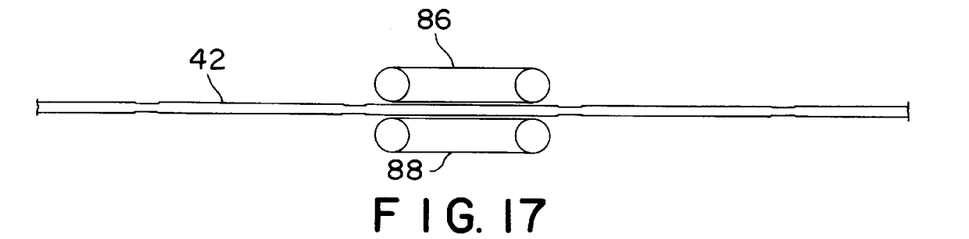
FIGS. 17–19 show various embodiments of drives for the traction means.
Figure 18:
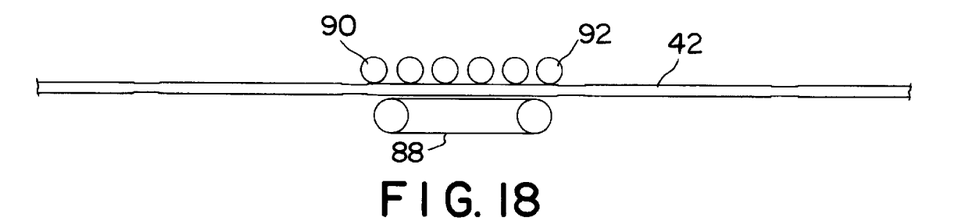
Figure 19:
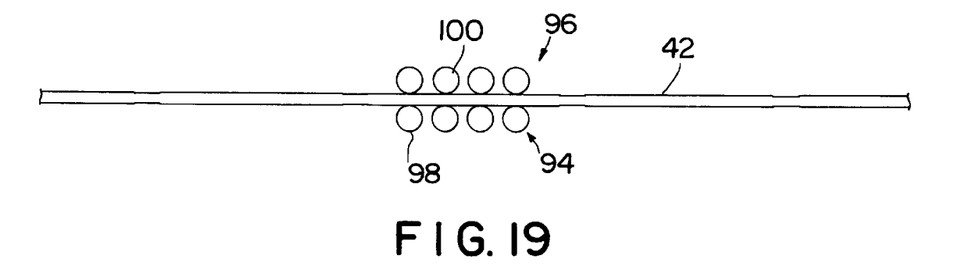

Further drive means for the belt (42) are shown in FIGS. 17–19.

The belt (42) can be clamped between endless drive belts (86), (88) to achieve the necessary frictional grip in this way.

According to the embodiment in FIG. 18, the belt (42) passes between the endless belt (88) and along a line of friction wheels (90), (92).

In accordance with the embodiment in FIG. 19, friction wheels (98), (100) are disposed along lines (94, 96), between which friction wheels the belt (42) is pulled by frictional grip.

I claim:

1. A mono- or twin-rail over head chain conveyor (10', 12') for transporting heavy loads having a chain track (14) in the form of an I-shaped profile with running gear (18,20) which can move along said track and having roller blocks (26,28) for mounting rollers (30,32) which are supported on said chain track, said roller blocks being connected to a traction means (42) for pulling said running gear and said running gear being designed for a mono-rail overhead chain conveyor in the form of loading running gear and for a twin-rail overhead chain conveyor in the form of towing running gear which interacts with loading running gear (82) movable on a load rail (78) running below said chain track, wherein a belt having a rectangular cross-section and made of a rubber or plastic material with a single-stranded insert (46) of metal, glass fiber or carbon fiber is used as said traction means (42).

2. A mono- or twin-rail overhead chain conveyor according to claim 1, wherein said insert is vulcanized into said belt in the form of a metal wire rope (46) and runs coaxially thereto along its longitudinal axis (44).

3. A mono- or twin-rail overhead chain conveyor (10', 12') for transporting heavy loads having a chain track (14) in the form of an I-shaped profile with running gear (18,20) which can move along said track and having roller blocks (26,28) for mounting rollers (30,32) which are supported on said chain track, said roller blocks being connected to a traction means (42) for pulling said running gear and said running gear being designed for a mono-rail overhead chain conveyor in the form of loading running gear and for a twin-rail overhead chain conveyor in the form of towing running gear which interacts with loading running gear (82) movable on a load rail (78) running below said chain track, wherein a belt having a rectangular cross-section and made of a rubber or plastic material with a single-stranded insert (46) of metal, glass.

4. A mono- or twin-rail overhead chain conveyor according to claim 1, wherein said belt (42) has a width D corresponding to that of a bolt-linked or flat-linked chain (24) used in a mono- or twin-rail overhead chain conveyor (10', 12').

5. A mono- or twin-rail overhead chain conveyor according to claim 1, wherein the metal inserts (62, 64) of free ends (58, 60) of said belt (42) are exposed and connected to a wire rope (70) running parallel to said ends (62, 64) by clamping elements (66, 68).

6. A mono- or twin-rail overhead chain conveyor according to claim 1, wherein said belt (42) is guided between friction wheels (98, 100) used as a drive.

7. A mono- or twin-rail overhead chain conveyor according to claim 6, wherein said friction wheels (98, 100) are disposed along lines (94, 96) running parallel to one another.

8. A mono- or twin-rail overhead chain conveyor according to claim 1, wherein
said belt (42) is guided between endless belts (86, 88) used as a drive.

9. A mono- or twin-rail overhead chain conveyor according to claim 1, wherein
along an endless drive belt is in contact with one side of said belt (42) and several pressure rollers (90, 92) are disposed along a line and associated with said drive belt on the opposite side.

10. A mono- or twin-rail overhead chain conveyor according to claim 1, wherein
for formation of a horizontal curve said belt (42) is guided along a section of a rotatably mounted disk (72).

11. A mono- or twin-rail overhead chain conveyor according to claim 1, wherein
for formation of a horizontal curve said belt (42) is guided along a rollers (74, 76) mounted on an arc or circular section.

12. A mono- or twin-rail overhead chain conveyor according to claim 1, wherein
the cross-section of said belt is a rectangle whose width to height ratio is approximately 1.2:1.

* * * * *